(No Model.)
J. A. TEMPLE.
NUT LOCK.
No. 587,110. Patented July 27, 1897.
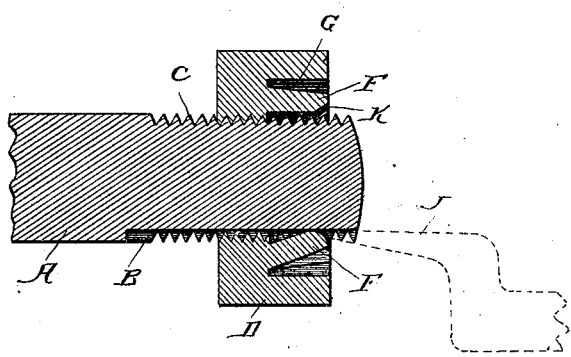
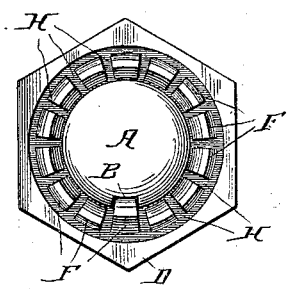
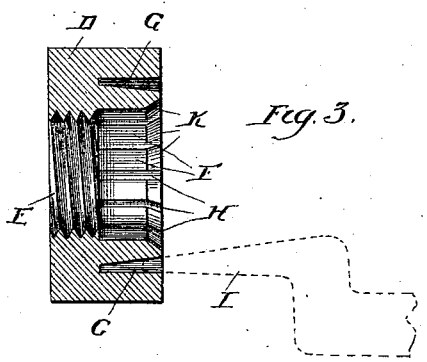
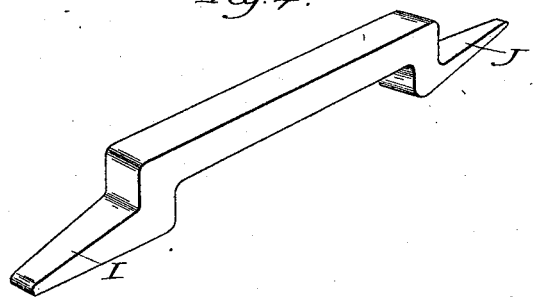
Witnesses:
H. B. Hallock.
S. S. Williamson
Inventor:
John A. Temple.
By Geo. H. Holgate
Attorney.

UNITED STATES PATENT OFFICE.

JOHN A. TEMPLE, OF SHAMOKIN, PENNSYLVANIA.

NUT-LOCK.

SPECIFICATION forming part of Letters Patent No. 587,110, dated July 27, 1897.

Application filed June 6, 1896. Serial No. 594,495. (No model.)

*To all whom it may concern:*

Be it known that I, JOHN A. TEMPLE, a citizen of the United States, residing at Shamokin, in the county of Northumberland and State of Pennsylvania, have invented certain new and useful Improvements in Nut-Locks, of which the following is a specification.

My invention relates to a new and useful improvement in nut-locks, and has for its object to provide a device of this description by means of which a nut may be securely locked upon its bolt against retrograde movement and yet when it is necessary to back said nut from off the threads of the bolt this may be accomplished without injury to either the bolt or nut, so that the bolt and nut may be further used.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring to the accompanying drawings, forming a part of this specification, in which—

Figure 1 is a central section of a bolt and nut, the latter being made in accordance with my improvement, showing in dotted lines a tool for withdrawing one of the locking-teeth; Fig. 2, an end view of the nut when locked in place upon its bolt; Fig. 3, a cross-section of a nut made in accordance with my improvement, showing its construction and also illustrating the position of the tool which I prefer to use in forcing one of the locking-teeth into engagement with the groove in the bolt; and Fig. 4 is a perspective of a tool adapted for use in connection with my improved nut.

In carrying out my invention I provide the bolt A with groove B, running longitudinally thereof and cut to the depth of the threads C, formed upon said bolt after the manner of a keyway or spline. The nut D has formed therein the usual threads E, adapted for engagement with the threads C upon the bolt, and this nut also has a series of teeth F, set concentrically with the center hole therein, and in practice I prefer to form these teeth by turning a groove G within the outer face of the nut, cutting away the central opening in said nut to the depth of the threads therein, and, finally, slotting the annular ring which is thus formed, as indicated at H, by any suitable method, such as milling. From this it will be seen that after the nut has been run upon the bolt and jammed against the surface of the object being held by said bolt and nut the tooth which lies in alinement with the groove in the bolt has only to be forced inward into engagement with said groove to prevent any retrograde movement of the nut, and either of these teeth may be thus forced in by the use of a tool, such as is indicated in Fig. 4, which is provided with two chisel-wedges I and J, the latter best serving the purpose of forcing the teeth inward, the manner of using being shown in Fig. 3.

When it becomes necessary to back off a nut, this is accomplished by the nose I being placed in the groove and a sufficient blow struck the tool with the hammer to pry the tooth which is in engagement with the groove upward, and in order to facilitate this operation I prefer to bevel the outer edges of the teeth, as indicated at K, thus giving the chisel I an initial start. Should at any time the parts clamped by the bolts and nut become worn, this may be compensated for by the setting up of the nut, which is accomplished by the disengagement of the locking-tooth from the groove, resetting the nut, and again force another of the teeth into engagement with said groove. It sometimes happens in crowding a nut upon the bearing-surface that no one of the teeth will lie in exact alinement with the groove in the bolt; but this difficulty is obviated by forcing one of the chisels between the tooth nearest in alinement with said groove and the next tooth thereto with sufficient force to crowd the desired tooth to one side, thereby bringing it into proper position for engagement with said groove, which is afterward accomplished, as before described.

By the use of my improvement it will be seen that no jam-nuts are needed for holding the primary nut against the surface, and yet said primary nut has no tendency to a retrograde movement and therefore will firmly hold the parts together that are bound by the bolt and nut against any vibration which may be imparted to the parts thus held.

Having thus fully described my invention, what I claim as new and useful is—

1. In combination with a bolt having a longitudinal slot cut therein, a nut adapted to run upon said bolt, said nut having an annular wedge-shaped groove cut in its upper surface, said ring thus formed being slotted to form teeth and having a bevel around its outer edge, as and for the purpose described.

2. In combination with a bolt having a longitudinal slot cut therein, a nut adapted to slide upon said bolt, said nut having an annular wedge-shaped groove cut in its upper surface, said ring thus formed being beveled around its outer edge and being slotted to form teeth, said nut having the central opening cut away to the length of the teeth and depth of the threads as and for the purpose described.

In testimony whereof I have hereunto affixed my signature in the presence of two subscribing witnesses.

JOHN A. TEMPLE.

Witnesses:
S. S. WILLIAMSON,
C. S. SHINDEL.